(12) United States Patent
Tsubouchi et al.

(10) Patent No.: US 7,063,002 B2
(45) Date of Patent: Jun. 20, 2006

(54) NEGATIVE PRESSURE TYPE BOOSTER

(75) Inventors: Kaoru Tsubouchi, Kariya (JP); Yoji Inoue, Kariya (JP); Yoko Takatori, Kariya (JP)

(73) Assignee: Advics Co., Ltd., Kariya (JP)

( * ) Notice: Subject to any disclaimer, the term of this patent is extended or adjusted under 35 U.S.C. 154(b) by 29 days.

(21) Appl. No.: 10/976,927

(22) Filed: Nov. 1, 2004

(65) Prior Publication Data

US 2005/0098029 A1  May 12, 2005

(30) Foreign Application Priority Data

Nov. 12, 2003  (JP) .............................. 2003-382934

(51) Int. Cl.
*B60T 13/57* (2006.01)

(52) U.S. Cl. .................................... 91/369.3; 91/376 R

(58) Field of Classification Search ............... 91/369.3, 91/376 R
See application file for complete search history.

(56) References Cited

U.S. PATENT DOCUMENTS 5,704,270 A    1/1998  Tsubouchi

| 5,904,088 | A  | * | 5/1999 | Ogura et al. | ............... 91/376 R |
| 6,709,071 | B1 | * | 3/2004 | Fukami | .................... 303/113.3 |
| 6,715,401 | B1 | * | 4/2004 | Takasaki et al. | ........... 91/369.3 |
| 6,755,116 | B1 | * | 6/2004 | Tsubouchi et al. | ........ 91/376 R |

FOREIGN PATENT DOCUMENTS

JP          8-310379          11/1996

* cited by examiner

*Primary Examiner*—Thomas E. Lazo
(74) *Attorney, Agent, or Firm*—Buchanan Ingersoll PC

(57) ABSTRACT

In a negative pressure type booster, an atmospheric valve seat is formed on an annular disk of an input member, which disk extends radially outward. The annular disk and an annular diaphragm located frontward of the annular disk and mounted to the input member define an annular atmospheric chamber. The atmospheric chamber communicates with the atmosphere via an air hole formed in the annular disk. The diaphragm is supported from the front by a power piston. The diaphragm is a flexible member. Inner and outer circumferential portions of the flexible member are formed into respective rolling portions for allowing frontward/rearward movement of the input member by means of curviform deformation. An atmospheric control valve portion, which is seated on and separated from the atmospheric valve seat, and a vacuum control valve portion, which is seated on and separated from a vacuum valve seat formed on the power piston, are axially separated.

8 Claims, 3 Drawing Sheets

NEGATIVE PRESSURE TYPE BOOSTER

BACKGROUND OF THE INVENTION

1. Field of the Invention

The present invention relates to a negative pressure type booster for use in, for example, a vehicular brake system.

2. Description of the Related Art

A negative pressure type booster of the above-mentioned type is disclosed in, for example, Japanese Patent Application Laid-Open (kokai) No. 08-310379. The disclosed negative pressure type booster includes a housing; a movable wall mounted in the housing in a frontward/rearward movable condition and dividing the interior of the housing into a constant-pressure chamber and a variable-pressure chamber; a power piston connected to the movable wall in a frontward/rearward movable condition; an input member provided in the power piston in a frontward/rearward movable condition relative to the power piston and receiving an external operation force applied thereto in a frontward direction; an output member for outputting, to an external device, a thrust force generated frontward by the power piston; a control valve mounted in the power piston and comprising an atmospheric control valve portion and a vacuum control valve portion, the atmospheric control valve portion facing frontward, toward an atmospheric valve seat provided on the input member, and adapted to establish/shut off communication between the variable-pressure chamber and the atmosphere in cooperation with the atmospheric valve seat, and the vacuum control valve portion facing frontward, toward a vacuum valve seat provided on the power piston, and adapted to establish/shut off communication between the variable-pressure chamber and the constant-pressure chamber in cooperation with the vacuum valve seat; first biasing means for biasing the control valve frontward toward the atmospheric valve seat and the vacuum valve seat; second biasing means for biasing the input member rearward; and a stopper for limiting the quantity of movement of the input member relative to the power piston effected by biasing force of the second biasing means. Notably, when the negative pressure type booster is applied to, for example, a vehicular brake system, the term "rearward" refers to the side toward a brake pedal or the side toward the vehicular rear, and the term "frontward" refers to the side toward a brake master cylinder or the side toward the vehicular front.

In the negative pressure type booster disclosed in above-mentioned Japanese Patent Application Laid-Open (kokal) No. 08-310379, the input member includes a plunger that is mounted to the power piston in a frontward/rearward movable condition, and an input rod connected to the plunger. The atmospheric valve seat is formed at a rear end portion of the plunger. In such a configuration, when the atmospheric valve seat and the atmospheric control valve portion are in contact with each other to thereby shut off communication between the variable-pressure chamber and the atmosphere, a differential pressure between a vacuum in the variable-pressure chamber and the atmospheric pressure is exerted on the area of an atmospheric valve as measured with the effective diameter of the atmospheric valve (pressure reception area). A differential-pressure-induced force pushes the input member frontward. In an ordinary state (in a non-operational state; hereinafter the same applies), in order to maintain contact between the atmospheric valve seat and the atmospheric control valve portion, the biasing force of the second biasing means must be set greater than the differential-pressure-induced force.

In a negative pressure type booster of the above-mentioned type, in an ordinary state where the atmospheric valve seat is in contact with the atmospheric control valve portion, and the vacuum control valve portion is separated from the vacuum valve seat, a vacuum in the variable-pressure chamber may vary due to, for example, a variation in pressure of a vacuum source. Thus, the biasing force of the second biasing member is determined so as to cope with a potential high vacuum associated with the vacuum variation in the variable-pressure chamber. As a result, in an ordinary state, if a vacuum in the variable-pressure chamber becomes low, an operation force required to separate the atmospheric valve seat from the atmospheric control valve portion; i.e., startup load, will increase, giving an operator (a vehicle driver) a sensation of unusual operation. This problem arises eminently in the case where the effective diameter of the atmospheric valve is increased in order to obtain high operational response, as in the case of the above-mentioned negative pressure type booster disclosed in the above-described patent publication.

SUMMARY OF THE INVENTION

The present invention has been accomplished to solve the above-mentioned problem, and an object of the invention is to provide a negative pressure type booster having a mechanism for reducing a differential-pressure-induced force (a working force induced by a differential pressure between a vacuum in a variable-pressure chamber and the atmospheric pressure) exerted on an input member having an atmospheric valve seat, whereby even when, in an ordinary state, a vacuum in the variable-pressure chamber varies, a variation in operation force can be reduced.

To achieve the above object, the present invention provides a negative pressure type booster comprising a housing; a movable wall mounted in the housing to be movable frontward and rearward, the movable wall dividing the interior of the housing into a constant-pressure chamber and a variable-pressure chamber; a power piston connected to the movable wall and being movable frontward and rearward; an input member provided in the power piston to be movable frontward and rearward relative to the power piston, the input member receiving an external operation force applied thereto in a frontward direction; an output member for outputting, to an external device, a frontward thrust force generated by the power piston; a control valve mounted in the power piston and comprising an atmospheric control valve portion and a vacuum control valve portion, the atmospheric control valve portion facing frontward, toward an atmospheric valve seat provided on the input member, and adapted to establish and shut off communication between the variable-pressure chamber and the atmosphere in cooperation with the atmospheric valve seat, and the vacuum control valve portion facing frontward, toward a vacuum valve seat provided on the power piston, and adapted to establish and shut off communication between the variable-pressure chamber and the constant-pressure chamber in cooperation with the vacuum valve seat; first biasing means for biasing the control valve frontward toward the atmospheric valve seat and the vacuum valve seat; second biasing means for biasing the input member rearward; and a stopper for limiting a quantity of movement of the input member relative to the power piston effected by biasing force of the second biasing means. In the negative pressure type booster of the present invention, the atmospheric valve seat is formed on an annular portion of the input member extending radially outward; the annular portion and an annular diaphragm located frontward of the annular portion and mounted to the input member define an annular atmospheric chamber; the atmospheric chamber communicates with the atmosphere via an air hole formed in the annular portion or in the input member; and the diaphragm is supported from the front by the power piston.

In the negative pressure type booster of the present invention, the area of a portion of the input member having the atmospheric valve seat which receives a differential pressure (a differential pressure between a vacuum in the variable-pressure chamber and the atmospheric pressure) can be equal to a differential area obtained by subtracting the cross-sectional area of the annular atmospheric chamber from the area of the atmospheric valve as measured with the effective diameter of the atmospheric valve; in other words, the area which receives the differential pressure can be reduced by the cross-sectional area of the annular atmospheric chamber. Accordingly, a differential-pressure-induced force (a working force induced by the differential pressure between a vacuum in the variable-pressure chamber and the atmospheric pressure) that is exerted on the input member having the atmospheric valve seat can be reduced. Even when, in an ordinary state, a vacuum in the variable-pressure chamber varies, a variation in operation force associated with separation of the atmospheric valve seat from the atmospheric control valve portion; i.e., a variation in startup force, can be reduced to such a level as not to give an operator (a vehicle driver) a sensation of unusual operation.

Preferably, the diaphragm is a flexible member (e.g., a rubber diaphragm), and an inner or outer circumferential portion of the flexible member assumes a rolling structure for allowing frontward/rearward movement of the input member by means of curviform deformation. In this case, in operation of the input member, the inner or outer circumferential portion of the flexible member undergoes curviform deformation to thereby allow frontward/rearward movement of the input member. Thus, the input member to which the flexible member is mounted can be operated smoothly.

Preferably, the control valve is configured such that the atmospheric control valve portion and the vacuum control valve portion are arranged axially apart from each other. In this case, the effective diameter of the atmospheric valve, which is composed of the atmospheric valve seat and the atmospheric control valve portion, can be increased without restriction by the vacuum control valve portion of the control valve. Thus, an air path can have a sufficiently large cross-sectional area, thereby enhancing operational response of the negative pressure type booster.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
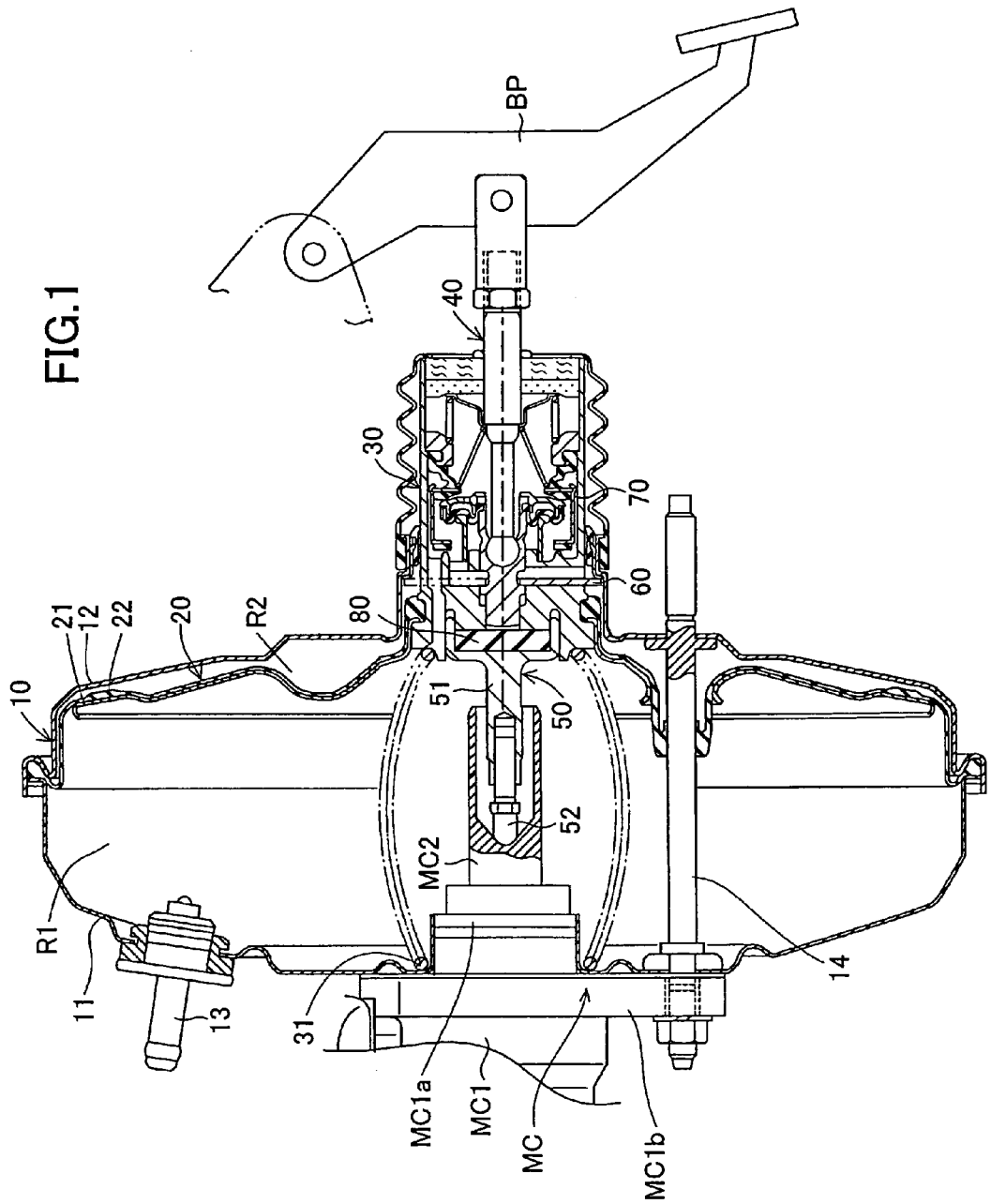
FIG. 1 is a sectional view showing a negative pressure type booster according to an embodiment of the present invention.
Figure 2:
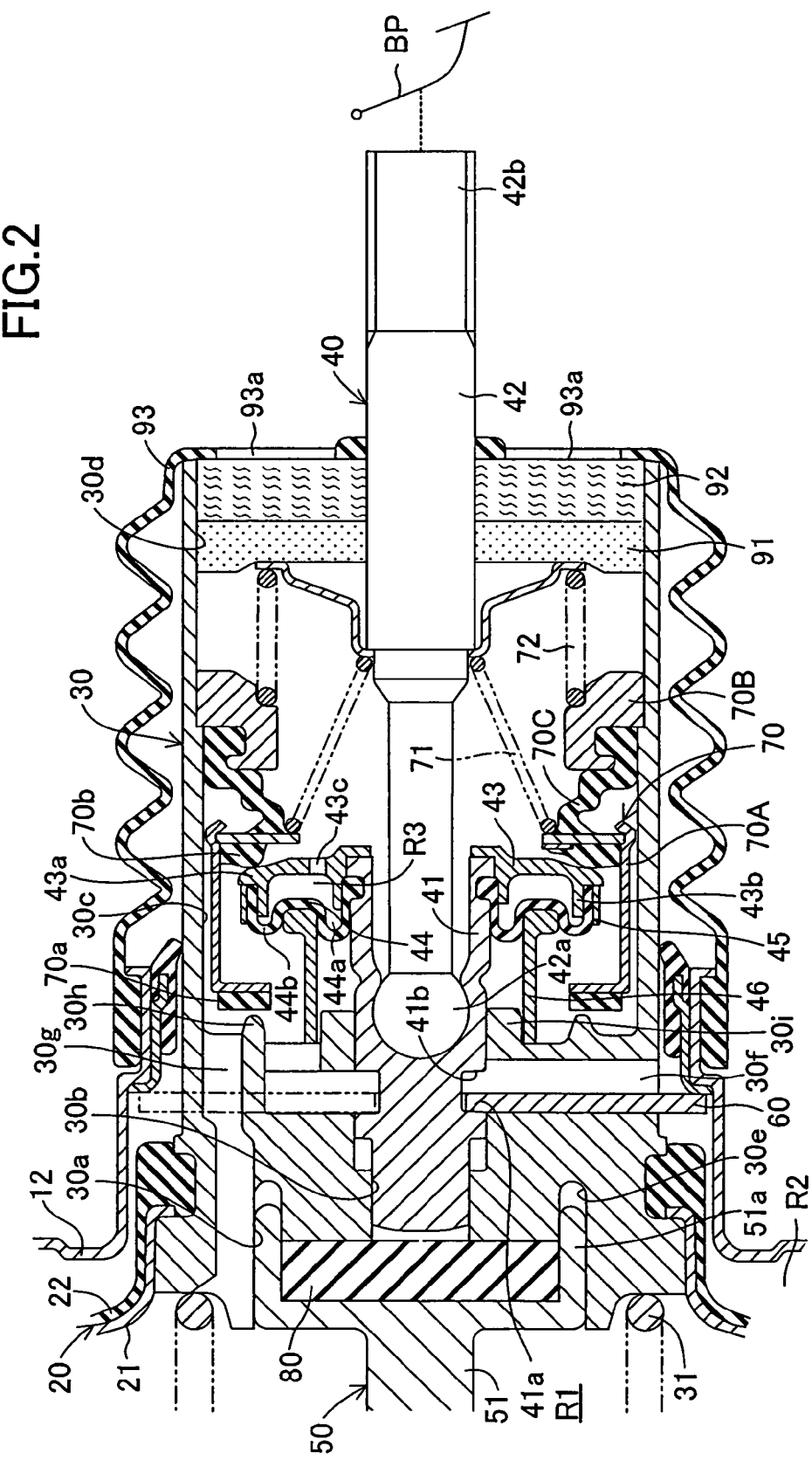
FIG. 2 is an enlarged sectional view showing a main portion of FIG. 1.

Embodiments of the present invention will next be described in detail with reference to the drawings. FIGS. 1 and 2 show a negative pressure type booster according to an embodiment of the present invention. The negative pressure type booster includes a movable wall 20 and a power piston 30, which are mounted to a housing 10, as well as an input member 40, an output member 50, a key member 60, and a control valve 70, which are mounted in the power piston 30.

As shown in FIG. 1, the housing 10 includes a front shell 11 and a rear shell 12. The movable wall 20 divides the interior of the housing 10 into a constant-pressure chamber R1 and a variable-pressure chamber R2. The constant-pressure chamber R1 communicates with a vacuum source (e.g., an unillustrated intake manifold of an engine) at all times via a vacuum introduction pipe 13. Communication is established/shut off between the variable-pressure chamber R2 and the constant-pressure chamber R1 and between the variable-pressure chamber R2 and the atmosphere. The housing 10 is fixedly attached to a vehicular body (not shown), by means of threaded rear end portions of a plurality of tie rods 14 (FIG. 1 shows only a single tie rod 14). The tie rods 14 extend airtightly through the housing 10 and the movable wall 20. Notably, a brake master cylinder MC is fixedly connected to threaded front end portions of the tie rods 14.

The movable wall 20 includes a metal plate 21 and a rubber diaphragm 22 and is disposed in a frontward/rearward movable condition relative to the housing 10. The diaphragm 22 is airtightly sandwiched, at its bead portion formed at its outer peripheral edge, between the front shell 11 and a peripheral bend edge portion of the rear shell 12. The diaphragm 22, together with the plate 21, is airtightly and fixedly fitted, at its bead portion formed at its inner peripheral edge, into a circumferential groove formed on the outer surface of a front flange portion of the power piston 30.

A rear end portion MC1a of a cylinder body MC1 of the brake master cylinder MC shown in FIG. 1 airtightly extends through a central cylinder portion of the front shell 11 and projects into the constant-pressure chamber R1. The rear surface of a flange portion MC1b of the cylinder body MC1 abuts the front surface of the front shell 11. A piston MC2 of the brake master cylinder MC projects rearward into the constant-pressure chamber R1 from the cylinder body MC1 and is pushed frontward by means of the front end of the output member 50.

The power piston 30 is a hollow piston connected to the movable wall 20. A cylindrical portion of the power piston 30 is connected to the rear shell 12 airtightly and in a frontward/rearward movable condition. A spring 31 disposed between the power piston 30 and the front shell 11 of the housing 10 biases the power piston 30 rearward. As shown in FIG. 2, an axial hole extends through the power piston 30. The axial hole includes, in the direction from the front end surface to the rear end surface of the power piston 30, a reaction chamber hole 30a; a stepped plunger receptive-hole 30b having a diameter smaller than that of the reaction chamber hole 30a; a support-member-and-control-valve receptive-hole 30c having a diameter greater than that of the plunger receptive-hole 30b; and a filter receptive-hole 30d. An annular groove 30e is formed on the power piston 30 integrally with the reaction chamber hole 30a and coaxially with the plunger receptive-hole 30b.

The power piston 30 has a radially extending key member insertion hole 30f in association with the plunger receptive-hole 30c. Also, the power piston 30 has a communication hole 30g through which the constant-pressure chamber R1 and the support-member-and-control-valve receptive-hole 30c can communicate with each other. An annular vacuum valve seat 30h is formed at a rear end portion of the communication hole 30g. A vacuum control valve portion 70a of the control valve 70 can be seated on the vacuum valve seat 30h.

The input member 40 is provided in the power piston 30 in a frontward/rearward movable condition relative to the power piston 30 and receives an external operation force. The input member 40 includes a plunger 41 and an input rod 42. The plunger 41 is accommodated in the plunger receptive-hole 30b and in the support-member-and-control-valve receptive-hole 30c and is axially (frontward/rearward) movable in relation to the power piston 30. The quantity of movement of the plunger 41 is limited by a key member 60 mounted to the power piston 30. The input rod 42 is articularly joined, at its spherical end portion 42a, to the plunger 41 and is connected, at its rear end portion 42b, to a brake pedal BP.

The plunger 41 can abut, at its front end, a reaction member 80 accommodated in the reaction chamber hole 30a of the power piston 30. An annular disk 43 is integrally mounted to the rear end of the plunger 41. An annular atmospheric valve seat 43a is formed on the rear surface of an outer circumferential portion of the disk 43. The atmospheric valve seat 43a is seated on an atmospheric control valve portion 70b of the control valve 70 in such a manner as to be able to be separated from the atmospheric control valve portion 70b. The reaction member 80 is a reaction rubber disk. While being accommodated in a cylindrical portion 51a of a rear member 51 of the output member 50, the reaction member 80 abuts the reaction force reception surface of the power piston 30 and can abut the front surface of the plunger 41.

The output member 50 includes the rear member 51 and an output rod 52 (see FIG. 1). The rear member 51, together with the reaction member 80, is mounted in the reaction chamber hole 30a of the power piston 30 and is fitted into the annular groove 30e, in an axially movable condition. The output rod 52 is united to a front end portion of the rear member 51. The front end of the output rod 52 abuts an engagement portion of the piston MC2 of the brake master cylinder MC in such a manner as to be able to push the piston MC2.

The key member 60 is a stopper for limiting the axial movement of the plunger 41 relative to the power piston 30 and for limiting the rearward movement of the power piston 30 relative to the housing 10. The key member 60 is inserted into the radially extending key member insertion hole 30f formed in the power piston 30. The axially measured thickness of the key member 60 is smaller than the axially measured dimension of the key member insertion hole 30f, so that the key member 60 can move axially by a predetermined quantity relative to the power piston 30.

The key member 60 can abut the rear shell 12 at the rear surface of its opposite end portions projecting radially outward from the power piston 30. The rearward movement limit position of the power piston 30 relative to the housing 10 is where, as shown in FIG. 2, the front wall of the key member insertion hole 30f is in contact with the front surface of the key member 60 while the rear surface of opposite end portions of the key member 60 is in contact with the rear shell 12. The key member 60 can abut, at its central portion, front and rear walls 41a and 41b, respectively, of an annular groove formed at an axially central portion of the plunger 41. The rearward movement limit position of the plunger 41 relative to the power piston 30 is where the front wall 41a of the annular groove is in contact with the front surface of the key member 60 while the rear surface of the key member 60 is in contact with the rear wall of the key member insertion hole 30f. The frontward movement limit position of the plunger 41 relative to the power piston 30 is where the rear wall 41b of the annular groove is in contact with the rear surface of the key member 60 while the front surface of the key member 60 is in contact with the front wall of the key member insertion hole 30f.

The control valve 70 includes an annular movable portion 70A having the vacuum control valve portion 70a and the atmospheric control valve portion 70b; an annular stationary portion 70B fitted fixedly and airtightly to a stepped portion formed on the wall of the support-member-and-control-valve receptive-hole 30c of the power piston 30; and a cylindrical bellows portion 70C connecting the annular movable portion 70A and the annular stationary portion 70B. The annular movable portion 70A is biased frontward by a spring 71 interposed between the annular movable portion 70A and the input rod 42 and is axially movable. While a spring 72 interposed between the annular stationary portion 70B and the input rod 42 applies frontward force to the annular stationary portion 70B, the annular stationary portion 70B is fixedly attached to the power piston 30.

The vacuum control valve portion 70a can be seated on and separated from the annular vacuum valve seat 30h formed on the power piston 30. When the vacuum control valve portion 70a is seated on the vacuum valve seat 30h, communication is shut off between the constant-pressure chamber R1 and the variable-pressure chamber R2. When the vacuum control valve portion 70a is separated from the vacuum valve seat 30h, communication is established between the constant-pressure chamber R1 and the variable-pressure chamber R2. The atmospheric control valve portion 70b can be seated on and separated from the annular atmospheric valve seat 43a formed on the annular disk 43. When the atmospheric control valve portion 70b is seated on the atmospheric valve seat 43a, communication is shut off between the variable-pressure chamber R2 and the atmosphere. When the atmospheric control valve portion 70b is separated from the atmospheric valve seat 43a, communication is established between the variable-pressure chamber R2 and the atmosphere.

The spring 71 is biasing means for biasing the movable portion 70A of the control valve 70 frontward toward the atmospheric valve seat 43a and the vacuum valve seat 30h and for biasing the input member 40 rearward. The spring 72 is biasing means for biasing the input member 40 rearward such that, in an ordinary state, the atmospheric valve seat 43a is in contact with (abuts) the atmospheric control valve portion 70b, and the vacuum control valve portion 70a is separated from the vacuum valve seat 30h. Biasing forces of the springs 71 and 72 are determined on the basis of a differential-pressure-induced force that in turn is determined on the basis of the effective diameter of the bellows portion 70C of the control valve 70 or the effective diameter (seal diameter) of an atmospheric valve that is composed of the atmospheric valve seat 43a and the atmospheric control valve portion 70b. Notably, the effective diameter of the bellows portion 70C is set substantially equal to the effective diameter (seal diameter) of the atmospheric valve.

Filters 91 and 92 are disposed in the filter receptive-hole 30d of the power piston 30 and between the input rod 42 and the power piston 30. The air can flow into the filters 91 and 92 through a ventilation hole 93a formed in a boot 93, which is adapted to externally protect the cylindrical body of the power piston 30. The boot 93 is fixedly fitted, at its front end portion, to a tubular rear-end portion of the rear shell 12 of the housing 10 and is fixedly fitted, at its rear end portion, to an axially intermediate portion of the input rod 42.

In the present embodiment, an annular diaphragm 44 is mounted to the plunger 41 and located frontward of the annular disk 43, which is mounted to the plunger 41. The annular diaphragm 44 and the annular disk 43 define an annular atmospheric chamber R3 on the forward side of the annular disk 43. The diaphragm 44 is formed of a flexible material such as rubber and is airtightly connected, at its bead portion formed at its inner circumferential edge, to the plunger 41. The diaphragm 44 is airtightly press-fitted, at its outer circumferential edge portion, to a cylindrical portion 43b formed at an outer circumferential portion of the annular disk 43. A metal ring 45 is bonded to the exterior of the outer circumferential edge portion of the diaphragm 44.

The annular atmospheric chamber R3, which is defined by the diaphragm 44 and the annular disk 43, communicates with the atmosphere via an air hole 43c (this air hole may be formed in the plunger 41 or in an engagement portion between the plunger 41 and the annular disk 43). The diaphragm 44 has rolling portions 44a and 44b formed at inner and outer circumferential portions, respectively. An end portion of a tubular support member 46 abuts the diaphragm 44 at the front surface of a portion extending between the rolling portions 44a and 44b. The rolling portions 44a and 44b project frontward and allow frontward/rearward movement of the plunger 41 by means of curviform deformation. The effective diameter of the rolling portion 44b, which is formed at an outer circumferential portion of the diaphragm 44, is set substantially equal to the effective diameter (seal diameter) of the atmospheric valve, which is composed of the atmospheric valve seat 43a and the atmospheric control valve portion 70b.

The tubular support member 46 is fixedly fitted, at its front end portion, to a boss portion 30i of the power piston 30 and supports the diaphragm 44 from the front. In a state where differential pressure is generated between the variable-pressure chamber R2 and the atmospheric chamber R3; i.e., in a state where the atmospheric valve seat 43a is in contact with (abuts) the atmospheric control valve portion 70b, and the vacuum control valve portion 70a is separated from the vacuum valve seat 30h, a differential-pressure-induced force exerted on the diaphragm 44 is supported by the power piston 30 via the tubular support member 46.

In the thus-configured negative pressure type booster of the present embodiment, during braking, the input member 40 moves frontward relative to the power piston 30 and against biasing forces of the springs 71 and 72. Thus, the atmospheric valve seat 43a is separated from the atmospheric control valve portion 70b, and the vacuum control valve portion 70a comes into contact with (abuts) the vacuum valve seat 30h. Also, the front end surface of the plunger 41 abuts the reaction member 80, and an ordinary braking operation is performed.

In the negative pressure type booster of the present embodiment, the annular diaphragm 44 is mounted to the input member 40 and located frontward of the annular disk 43; and the annular diaphragm 44 and the annular disk 43 define the annular atmospheric chamber R3. The annular atmospheric chamber R3 communicates with the atmosphere via the air hole 43c formed in the annular disk 43. A portion of the diaphragm 44 extending between the rolling portions 44a and 44b is supported from the front by the power piston 30 via the tubular support member 46.

Thus, the area of a portion of the annular disk 43 having the atmospheric valve seat 43a which receives a differential pressure (a differential pressure between a vacuum in the variable-pressure chamber R2 and the atmospheric pressure) can be equal to a differential area obtained by subtracting the cross-sectional area of the annular atmospheric chamber R3 from the area of the atmospheric valve as measured with the effective diameter of the atmospheric valve; in other words, the area which receives the differential pressure can be reduced by the cross-sectional area of the annular atmospheric chamber R3. Accordingly, a differential-pressure-induced force (a working force induced by the differential pressure between a vacuum in the variable-pressure chamber R2 and the atmospheric pressure) that is exerted on the annular disk 43 having the atmospheric valve seat 43a can be reduced. Even when, in an ordinary state (a state in which the atmospheric valve seat 43a is in contact with (abuts) the atmospheric control valve portion 70b, and the vacuum control valve portion 70a is separated from the vacuum valve seat 30h), a vacuum in the variable-pressure chamber R2 varies, a variation in operation force associated with separation of the atmospheric valve seat 43a from the atmospheric control valve portion 70b; i.e., a variation in startup force, can be reduced to such a level as not to give an operator (a vehicle driver) a sensation of unusual operation.

In the negative pressure type booster of the present embodiment, a diaphragm that is located frontward of the annular disk 43 and defines the annular atmospheric chamber R3 in cooperation with the annular disk 43 is the diaphragm 44 made of rubber, and inner and outer circumferential portions of the diaphragm 44 are formed into the rolling portions 44a and 44b, respectively, for allowing frontward/rearward movement of the input member 40 by means of curviform deformation. Thus, in a braking operation; i.e., in operation of the input member 40, the inner and outer circumferential portions of the diaphragm 44 undergo curviform deformation to thereby allow frontward/rearward movement of the input member 40. Thus, the input member 40 to which the diaphragm 44 is mounted can be operated smoothly.

In the negative pressure type booster of the present embodiment, the control valve 70 is configured such that the atmospheric control valve portion 70b and the vacuum control valve portion 70a are arranged axially apart from each other. Thus, the effective diameter of the atmospheric valve, which is composed of the atmospheric valve seat 43a and the atmospheric control valve portion 70b, can be increased without restriction by the vacuum control valve portion 70a of the control valve 70. Thus, an air path can have a sufficiently large cross-sectional area, thereby enhancing operational response of the negative pressure type booster.

Figure 3:
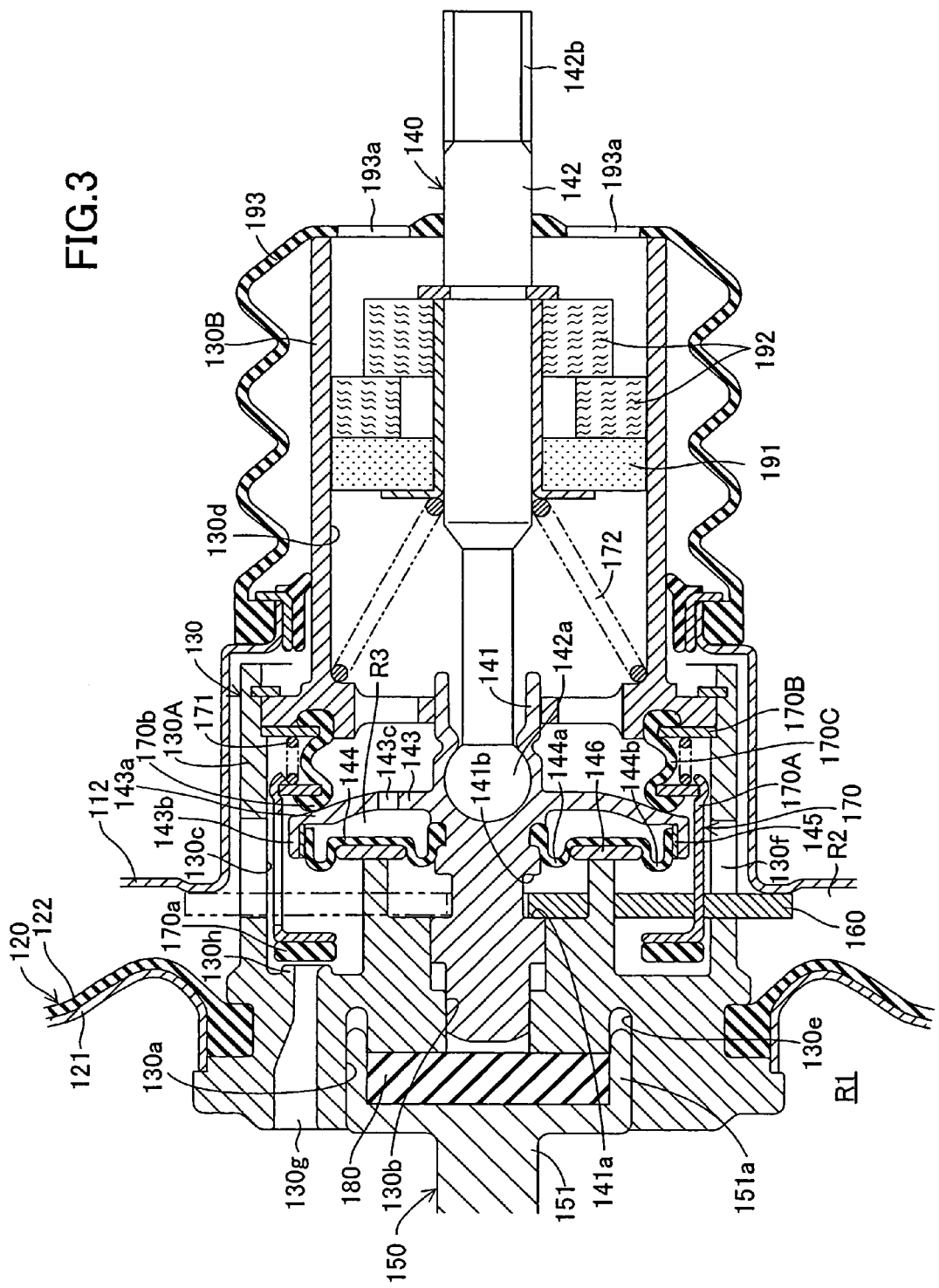
FIG. 3 is an enlarged sectional view showing a main portion of a negative pressure type booster according to another embodiment of the present invention.

FIG. 3 shows a negative pressure type booster according to another embodiment of the present invention. In the negative pressure type booster of FIG. 3, a power piston 130 includes a large-diameter power piston 130A and a small-diameter power piston 130B to thereby implement a large-diameter atmospheric valve seat 143a. The atmospheric valve seat 143a is formed on an annular disk portion 143, which is integrally formed on a plunger 141. An atmospheric valve that is composed of the atmospheric valve seat 143a and an atmospheric control valve portion 170b is disposed in the proximity of the variable-pressure chamber R2, to thereby reduce air flow resistance involved in entry of the air into the variable-pressure chamber R2. Thus, the negative pressure type booster of the present embodiment exhibits higher operational response as compared with the previously described embodiment.

The negative pressure type booster of FIG. 3 is substantially identical with that of FIGS. 1 and 2 except that, for example, a vacuum pressure valve seat 130h is arcuately formed at a rear end portion of a communication hole 130g formed in the large-diameter power piston 130A; an annular support plate 146 is affixed to a portion of a diaphragm 144 extending between rolling portions 144a and 144b and is supported by the power piston 130A; a spring 171 is disposed between a movable portion 170A of a control valve 170 and a stationary portion 170B of the control valve 170, which is fixedly attached to the small-diameter power piston 130B, and biases the movable portion 170A frontward; a spring 172 is disposed between an input rod 142 and the small-diameter power piston 130B and biases the input rod 142 rearward; and filters 191 and 192 are mounted to the input rod 142 in a unitarily movable condition. Thus, the same or similar structural features are denoted by common reference numerals plus 100, and repeated description thereof is omitted.

The above embodiments are described while mentioning a single-type negative pressure type booster. However, the present invention may be embodied in the form of a tandem- or triple-type negative pressure type booster or may be embodied in various other forms without departing from the scope of the invention.

What is claimed is:

1. A negative pressure type booster comprising:
a housing;
a movable wall mounted in the housing to be movable frontward and rearward, the movable wall dividing the interior of the housing into a constant-pressure chamber and a variable-pressure chamber;
a power piston connected to the movable wall and being movable frontward and rearward;
an input member provided in the power piston to be movable frontward and rearward relative to the power piston, the input member receiving an external operation force applied thereto in a frontward direction;
an output member for outputting, to an external device, a frontward thrust force generated by the power piston;
a control valve mounted in the power piston and comprising an atmospheric control valve portion and a vacuum control valve portion, the atmospheric control valve portion facing frontward, toward an atmospheric valve seat provided on the input member, and adapted to establish and shut off communication between the variable-pressure chamber and the atmosphere in cooperation with the atmospheric valve seat, and the vacuum control valve portion facing frontward, toward a vacuum valve seat provided on the power piston, and adapted to establish and shut off communication between the variable-pressure chamber and the constant-pressure chamber in cooperation with the vacuum valve seat;
first biasing means for biasing the control valve frontward toward the atmospheric valve seat and the vacuum valve seat;
second biasing means for biasing the input member rearward; and
a stopper for limiting a quantity of movement of the input member relative to the power piston effected by biasing force of the second biasing means;

wherein the atmospheric valve seat is formed on an annular portion of the input member extending radially outward; the annular portion and an annular diaphragm located frontward of the annular portion and mounted to the input member define an annular atmospheric chamber; the atmospheric chamber communicates with the atmosphere via an air hole formed in the annular portion or in the input member; and the diaphragm is supported from the front by the power piston.

2. A negative pressure type booster according to claim 1, wherein the diaphragm is a flexible member, and an inner or outer circumferential portion of the flexible member assumes a rolling structure for allowing frontward and rearward movements of the input member by means of curviform deformation.

3. A negative pressure type booster according to claim 2, wherein the control valve is configured such that the atmospheric control valve portion and the vacuum control valve portion are arranged axially apart from each other.

4. A negative pressure type booster according to claim 2, wherein the control valve includes an annular movable portion having the vacuum control valve portion and the atmospheric control valve portion; an annular stationary portion fitted fixedly and airtightly to the power piston; and a cylindrical bellows portion connecting the annular movable portion and the annular stationary portion, and the effective diameter of the bellows portion is set substantially equal to the effective diameter of an atmospheric valve, which is composed of the atmospheric valve seat and the atmospheric control valve portion.

5. A negative pressure type booster according to claim 2, wherein the effective diameter of a rolling portion, which is formed at the outer circumferential portion of the diaphragm, is set substantially equal to the effective diameter of an atmospheric valve, which is composed of the atmospheric valve seat and the atmospheric control valve portion.

6. A negative pressure type booster according to claim 1, wherein the control valve is configured such that the atmospheric control valve portion and the vacuum control valve portion are arranged axially apart from each other.

7. A negative pressure type booster according to claim 6, wherein the control valve includes an annular movable portion having the vacuum control valve portion and the atmospheric control valve portion; an annular stationary portion fitted fixedly and airtightly to the power piston; and a cylindrical bellows portion connecting the annular movable portion and the annular stationary portion, and the effective diameter of the bellows portion is set substantially equal to the effective diameter of an atmospheric valve, which is composed of the atmospheric valve seat and the atmospheric control valve portion.

8. A negative pressure type booster according to claim 1, wherein the control valve includes an annular movable portion having the vacuum control valve portion and the atmospheric control valve portion; an annular stationary portion fitted fixedly and airtightly to the power piston; and a cylindrical bellows portion connecting the annular movable portion and the annular stationary portion, and the effective diameter of the bellows portion is set substantially equal to the effective diameter of an atmospheric valve, which is composed of the atmospheric valve seat and the atmospheric control valve portion.

* * * * *